United States Patent

Yokota et al.

(10) Patent No.: US 8,309,215 B2
(45) Date of Patent: Nov. 13, 2012

(54) RUBBER-METAL LAMINATE

(75) Inventors: Atsushi Yokota, Kanagawa (JP); Toshihiro Higashira, Kanagawa (JP)

(73) Assignee: NOK Corporation, Tokyo (JP)

( * ) Notice: Subject to any disclaimer, the term of this patent is extended or adjusted under 35 U.S.C. 154(b) by 232 days.

(21) Appl. No.: 12/593,501

(22) PCT Filed: Mar. 27, 2008

(86) PCT No.: PCT/JP2008/055824
§ 371 (c)(1),
(2), (4) Date: Sep. 28, 2009

(87) PCT Pub. No.: WO2008/123339
PCT Pub. Date: Oct. 16, 2008

(65) Prior Publication Data
US 2010/0086769 A1  Apr. 8, 2010

(30) Foreign Application Priority Data
Mar. 27, 2007  (JP) ................. 2007-080826

(51) Int. Cl.
*B32B 5/16*   (2006.01)
*B32B 15/04*  (2006.01)
*B32B 27/00*  (2006.01)

(52) U.S. Cl. .................. 428/327; 428/457; 428/500
(58) Field of Classification Search .................. 428/457, 428/500, 327
See application file for complete search history.

(56) References Cited

U.S. PATENT DOCUMENTS

| 5,548,028 | A  | * | 8/1996 | Tabb ............................ 525/194 |
| 6,054,509 | A  | * | 4/2000 | Arai et al. ..................... 523/428 |
| 6,620,866 | B1 | * | 9/2003 | Obrecht et al. ................. 524/81 |
| 7,094,825 | B2 | * | 8/2006 | Yamanaka .................... 524/495 |
| 7,173,087 | B2 | * | 2/2007 | Tokumitsu et al. ............ 524/565 |
| 2004/0266938 | A1 | | 12/2004 | Tokumitsu et al. |
| 2005/0014904 | A1 | * | 1/2005 | Fujita et al. ................. 525/330.4 |

FOREIGN PATENT DOCUMENTS

| JP | 11-500770 | 1/1999 |
| JP | 11-216799 | 8/1999 |
| JP | 11-221875 | 8/1999 |
| JP | 2000-006308 | 1/2000 |
| JP | 2003-334885 | 11/2003 |
| JP | 2004-011576 | 1/2004 |
| JP | 2004-076699 | 3/2004 |
| JP | 2004-277435 | 10/2004 |
| JP | 2006-218630 | 8/2006 |
| WO | WO 2004/022643 | 3/2004 |

OTHER PUBLICATIONS

Machine Translation of Fukasawa et al. (JP 2006-218630), Aug. 2006.*
Machine Translation of Tora et al. (JP 11-216799), Aug. 1999.*
International Preliminary Report on Patentability (Chapter I) and Written Opinion from corresponding PCT application No. PCT/JP2008/055824, dated Oct. 29, 2009, 7 pages.

* cited by examiner

*Primary Examiner* — Thao T. Tran
(74) *Attorney, Agent, or Firm* — Brinks Hofer Gilson & Lione

(57) ABSTRACT

A hydrogenated nitrile rubber-metal laminate having distinguished heat and rubber bulging resistances at elevated temperatures and surface pressures, which comprises a metallic sheet subjected to a hexavalent Cr ions-free chemical conversion treatment, a defatting treatment, a surface-roughening treatment, a primer treatment, or a combination of the treatment, and an adhesive layer and a rubber layer successively laid on one or both surfaces of the metallic sheet, wherein the rubber layer is a vulcanizate of a hydrogenated nitrile rubber compound comprising 100 parts by weight of a hydrogenated nitrile rubber, 50-250 parts by weight of an inorganic filler containing not more than 20% by volume, on the basis of total compound, of a non-reinforcing inorganic filler having an average particle size of not more than 5 μm, 4-20 parts by weight of an organic peroxide, and preferably furthermore 2-10 parts by weight of N,N'-phenylene dimaleimide.

5 Claims, No Drawings

RUBBER-METAL LAMINATE

RELATED APPLICATIONS

The present application is a 35 U.S.C. §371 national stage filing of International Patent Application No. PCT/JP2008/055824, filed Mar. 27, 2008, to which priority is claimed under 35 U.S.C. §120 and through which priority is claimed under 35 U.S.C. §119 to Japanese Priority Patent Application No. 2007-080826, filed Mar. 27, 2007.

TECHNICAL FIELD

The present invention relates to a rubber-metal laminate, and more particularly to a rubber-metal laminate with a distinguished heat resistance, etc.

BACKGROUND ART

Stainless steel has been so far used as a metallic sheet for rubber-metal laminates directed to engine cylinder head gaskets. Rubber-metal laminates formed by vulcanization-bonding rubber on the stainless steel by direct application of a vulcanizable adhesive thereto have such problems as unsatisfactory adhesiveness, and heat resistance or liquid resistance.

To solve the problems, several methods for improving the adhesiveness between stainless steel and rubber by subjecting a primary treatment to the surface of stainless steel have been so far proposed, including, for example, a method for subjecting a coating type chromate treatment or phosphate treatment to the surface of stainless steel. Particularly in the gasket use, a coating type chromate treatment involving hexavalent chromium ions designates as a specific chemical substance has been generally used to improve the primary rust prevention and the adhesiveness, but the coating type chromate treatment involves such Cr ions and thus is environmentally not preferable.

Patent Document 1 JP-A-11-221875
Patent Document 2 JP-A-2000-6308

The present applicants have so far proposed various vulcanizable adhesive compositions or phenol resin-containing adhesives on the basis of an alkoxysilane as an adhesive for use between metal and nitrile rubber.

Patent Document 3 JP 3,669,973
Patent Document 4 JP-A-2003-334885
Patent Document 5 JP-A-2004-76699
Patent Document 6 JP-A-2004-277435
Patent Document 7 JP-A-2004-11576

These adhesives can attain the desired object as chromium-free adhesives, i.e. involving no hexavalent Cr ions, but still have a problem such as special considerations being required for applicable rubber species when compounding. The tight adhesiveness can be obtained between metal and rubber, but the heat resistance is still not satisfactory, even if well known hydrogenated nitrile rubber having a distinguished heat resistance is used. Furthermore, there is still room for improvement with respect to rubber bulging resistance (rubber flow resistance), when used at elevated temperatures and surface pressures.

DISCLOSURE OF THE INVENTION

Problem to be Solved by the Invention

The object of the present invention is to provide a rubber-metal laminate having a vulcanized rubber layer with a distinguished heat resistance at elevated temperatures such as 150° C. or higher, for example, a distinguished heat bending resistance at 200° C. for 100 hours, and also a distinguished rubber bulging resistance (rubber flow resistance), when used at elevated temperatures and surface pressures.

Means for Solving the Problem

The object of the present invention can be attained by a hydrogenated nitrile rubber-metal laminate, which comprises a metallic sheet subjected to a hexavalent Cr ions-free chemical conversion treatment, a defatting treatment, a surface-roughening treatment, a primer treatment, or a combination of the treatments, and an adhesive layer and a rubber layer successively laid on one or both surfaces of the metallic sheet, where the rubber layer is a vulcanizate of a hydrogenated nitrile rubber compound comprising 100 parts by weight of a hydrogenated nitrile rubber, 50-250 parts by weight of an inorganic filler containing not more than 20% by volume, on the basis of total compound, of a non-reinforcing inorganic filler having an average particle size of not more than 5 μm, 4-20 parts by weight of an organic peroxide, and preferably furthermore 2-10 parts by weight of N,N'-phenylenedimaleimide.

Effect of the Invention

A distinguished heat resistance at elevated temperatures such as 200° C., and not only a distinguished heat bending resistance at 200° C. for 100 hours, but also such a distinguished effect on a rubber bulging resistance (rubber flow resistance) under such severe conditions as 150° C. and a surface pressure of 3 tons/cm$^2$ (294 MPa) for a duration of 5 minutes, as will be shown later in the following Examples, can be obtained by using a hydrogenated nitrile rubber compound comprising 100 parts by weight of a hydrogenated nitrile rubber, 50-250 parts by weight of an inorganic filler containing not more than 20% by volume, on the basis of total compound, of a non-reinforcing inorganic filler having an average particle size of not more than 5 μm and 4-20 parts by weight of an organic peroxide, as a compound for forming the rubber layer in a rubber-metal laminate comprising a metallic sheet subjected to a hexavalent Cr-free chemical conversion treatment, a defatting treatment, a surface-roughening treatment, a primer treatment, or combination of the treatments, and an adhesive layer and a rubber layer successively laid on one or both surfaces of the metallic sheet. Thus, the present rubber-metal laminate is suitable for use as sealing materials highly requiring such properties, particularly engine gasket materials, for example, engine cylinder head gasket materials, etc.

BEST MODES FOR CARRYING OUT THE INVENTION

Nitrile Rubber Compound

Hydrogenated nitrile rubber (HNBR) is a rubber obtained by selective hydrogenation of only carbon-carbon double bonds in the acrylonitrile-butadiene rubber, and is characterized by largely improved heat aging resistance, weathering resistance, and chemical resistance, as compared with nitrile rubber. HNBR, preferably with a medium-high nitrile HNBR (CN content: 31-35%)—a high nitrile HNBR (CN content: 36-42%), more preferably with the medium-high nitrile HNBR can be used. In the present invention, commercially available product, for example, Zetpol 2000 (iodine value: 7 or less; a product of Nippon Geon Co.), Zetpol 2020 (iodine value: 28; a product of the same company), Zetpol 2010 (iodine value: 11; a product of the same company), etc. can be used. Those with an iodine value of 10-15 can be preferably used from the viewpoint of heat bending resistance. The simple substance with such an iodine value or a blend of the substances with different iodine values (for example, a blend of Zetpols 2000 and 2020, etc.), by blending to have such an iodine value, can be also used. The HNBR may be admixed with an inorganic filler, a cross-linking agent, a cross-linking accelerator, an antioxidant, etc. to prepare an HNBR compound for forming the rubber layer of the present rubber-metal laminate.

The inorganic filler for use in the present invention includes white carbon, basic magnesium carbonate, activated calcium carbonate, special grade calcium carbonate, ultrafine magnesium silicate, hard clay, carbon black, barium sulfate, talc, graphite, mica, kaolin, etc., which are used alone or in mixtures thereof. The inorganic fillers are effective for preventing the adhesive layer from peeling at the time of high temperatures dipping, and also for improving the water resistance.

Among the inorganic fillers, the non-reinforcing inorganic fillers other than the structurally developed filler such as white carbon or carbon black, as well as the fillers so treated with a silane coupling agent, etc. as to have a chemical interaction with polymers, include, for example, basic magnesium carbonate, activated calcium carbonate, special grade calcium carbonate, ultrafine magnesium silicate, hard clay, barium sulfate, talc, graphite, mica, kaolin, calcium silicate, etc., having an average particle size (where the largest length as observed by an electron microscope is defined as "particle size": or a catalog value, if available) of not more than 5 μm, generally 2-0.01 μm, and can be used in a proportion of not more than 20% by volume, preferably 5-20% by volume, on the basis of total hydrogenated nitrile rubber compound.

When the average particle size of the non-reinforcing inorganic filler exceeds 5 μm, the rubber compound solution will have a poor dispersion stability, resulting in uneven coating, uneven molding, etc. at the time of the coating and drying. When the content exceeds 20% by volume, no better result will be obtained in the bulging test. That is, the rubber will flow much more, when used at elevated temperatures and surface pressures, and coatability will be lowered at the time of rubber coating, so smooth seal surfaces will be hard to form. The unit % by volume (volumic fraction) can be determined by measuring total volume of the compound according to JIS K6268 A method corresponding to ASTM D297-93-16, while taking into account the specific gravity of the non-reinforcing inorganic filler involved therein.

The inorganic fillers including the non-reinforcing inorganic filler can be used in a proportion of 50-250 parts by weight, preferably 80-200 parts by weight, on the basis of 100 parts by weight of hydrogenated nitrile rubber. When the inorganic fillers are in a proportion of less than 50 parts by weight, the rubber will flow much more when used in elevated temperatures and surface pressures, whereas in a proportion of more than 250 parts by weight, the rubber will peel away more easily when air heated.

The cross-linking agent for use in the present invention is an organic peroxide, including, for example, 1,1-di-t-butylperoxy-3,3,5-trimethylcyclohexane, di-t-butyl peroxide, t-butylcumyl peroxide, dicumyl peroxide, 2,5-dimethyl-2,5-di(t-butylperoxy)hexane, 2,5-dimethyl-2,5-di(t-butylperoxy)hexine-3, 1,3-bis(t-butylperoxyisopropyl)benzene, etc. The organic peroxide can be used in a proportion of about 4 to about 20 parts by weight, preferably about 6 to about 16 parts by weight, on the basis of 100 parts by weight of hydrogenated nitrile rubber.

When 2-10 parts by weight, preferably 3-6 parts by weight, of N,N'-phenylenedimaleimide is used as a cross-linking accelerator on the basis of 100 parts by weight of hydrogenated nitrile rubber, the desirable rubber flow resistance (rubber bulging resistance) as well as the heat bending resistance can be obtained. When N,N'-phenylene dimaleimide is used in a proportion of more than 10 parts by weight, the storage stability of unvulcanized rubber will be deteriorated. Thus, this is not preferable.

The hydrogenated nitrile rubber composition can be optionally added with various other compounding ingredients so far generally used in the rubber industry than the afore-mentioned essential components, for example, polyfunctional unsaturated compounds such as liquid polybutadiene, triallyl(iso)cyanurate, trimethylolpropane tri(meth)acrylate, triallyl trimellitate, etc.; processing aids such as stearic acid, palmitic acid, paraffin wax, etc.; acid acceptors such as zinc oxide, magnesium oxide, hydrotalcite, etc.; an antioxidant, plasticizers such as dioctyl sebacate (DOS), etc., if desired.

The composition can be prepared by kneading the afore-mentioned components except a cross-linking agent (and a cross-linking accelerator) through a kneading machine such as a uniaxial extruder, a biaxial extruder, rolls, a Banbury mixer, a kneader, a high shearing type mixer, etc., followed by further kneading upon adding the cross-linking agent (and the cross-linking accelerator).

The afore-mentioned hydrogenated nitrile rubber composition is laid onto a metallic sheet through an adhesive layer, preferably a primer layer and an adhesive layer, successively laid on the metallic sheet.

Metallic Sheet

The metallic sheet for use in the present invention includes a metallic sheet subjected to a hexavalent Cr ions-free chemical conversion treatment, a defatting treatment, a surface-roughening treatment, a primer treatment, or a combination thereof, for example, a stainless steel sheet, an SPCC steel sheet, and aluminum sheet, each surface-roughening treated by shot blast, scotch bride, hair line, dull finish, etc. or defatted by a solvent or an alkali without the surface-roughening treatment, or a defatted metallic sheet subjected to a chemical conversion treatment other than the coating type chromate surface treatment, thereby forming an inorganic or organic rust-preventive film thereon from the viewpoint of improving the adhesiveness. In the case of SPCC steel sheet, it is the usual practice to form a zinc phosphate film or an iron phosphate film thereon as a primer, as will be described later. The sheet, particularly for gasket use, has a thickness of about 0.1 to about 1 mm.

Thus, a primer layer is preferably formed as an undercoating layer on the metallic sheet. The primer layer is not essential for improving the heat resistance of the rubber layer, which is the object of the present invention, but a large improvement of the heat resistant and water resistant can be expected when the rubber is to be bonded thereto to form a rubber-metal laminate. Particularly when the rubber-metal laminate is used as sealing materials, it is desirable to form the primer layer.

Primer Layer

The primer layer for use in the present invention includes an inorganic film such as a zinc phosphate film, an iron phosphate film, films of vanadium, zirconium, titanium, molybdenum, tungsten, manganese, zinc, cerium or compounds thereof, for example, oxides, etc. thereof, and an organic film such as silane-based, phenol resin-based, epoxy resin-based, urethane resin-based films, etc., and can be used generally commercially available primer solutions directly as well as such according to the well known art.

For the primer, it is also possible to use a surface-treating agent comprising zirconium element, phosphorus element and aluminum element, where an elemental mass ratio of Zr:P is 95:5-60:40, and that of Zr:Al is 90:10-10:90.

Patent Document 8: JP-A-2006-218630

The primer comprising the afore-mentioned components can be prepared in the form of a solution having a solid concentration of about 0.2 to about 5% wt. in an organic solvent such as an alcohol, e.g. methanol, ethanol, isopropyl alcohol, etc., a ketone, e.g. acetone, methyl ethyl ketone, etc., and the like.

The primer solution is applied to the metallic sheet with a coated primer weight of about 50 to about 200 mg/m$^2$ by spraying or dipping, or with a brush, a roll coater, and the like, followed by drying at room temperature or by hot air, and by baking at about 100° to about 250° C. for about 0.5 to about 20 minutes to form a primer layer.

Adhesive Layer

Generally, a commercially available phenol resin-based over coating agent is applied as a vulcanizable adhesive to the silane-based under coating agent layer (primer layer) provided on the metallic sheet. The commercially available product includes Metalock N31, a product of Toyo Kagaku Kenkyusho; Sixon 715, a product of Rohm & Haas; Chemlock TS1677-13, a product of Rhode Far East, etc. The same application method, application temperature, application time, etc. as in the case of the under coating agent can be used also in the case of the over coating agent to form an over coat layer having a thickness of about 1 to about 15 μm.

Hydrogenated Nitrile Rubber Layer

Unvulcanized hydrogenated nitrile rubber compound is applied as an organic solvent solution of rubber compound to the adhesive layer to form a vulcanizable rubber layer having a thickness of about 5 to about 200 μm, preferably about 5 to about 120 μm, and pressure vulcanized generally at about 150° to about 230° C. for about 0.5 to about 30 minutes.

To prevent baking and sticking of the surface of vulcanized rubber, a dispersion of graphite, carbon black, paraffin wax, etc. as the main components, added cellulose, acrylic resin, polybutadiene resin, etc. as a binder in a solvent such as toluene, etc. is applied to the surface of vulcanized rubber to form a non-sticking layer having a thickness of about 2 to about 10 μm.

EXAMPLES

The present invention will be described in detail below, referring to Examples.

Example 1

A Zr/P/Al (in mass composition ratio of 37/16/47)-based primer was applied to both surfaces of an alkali-defatted stainless steel (SUS301, a product of Nisshin Steel Co.) having a thickness of 0.2 mm to form primer layers on both surfaces, and then an adhesive having the following composition was applied to both surfaces of the primer layer so as to form a thickness of about 0.5 μm on each surface when dried, and air dried at room temperature, followed by heating at 200° C. for one minute to form adhesive layers on both surfaces:

| | Parts by weight |
|---|---|
| Phenol resin-based over coating adhesive (Sixon 715-A, a product of Rohm & Haas) | 12.0 |
| Hexamethylenetetramine-containing curing agent (715-B, a product of the same company as above) | 0.4 |
| Methyl ethyl ketone | 77.6 |
| Methanol | 10.0 |

A solution of hydrogenated nitrile rubber compound, obtained by kneading the following components through a kneader and open rolls, followed by dissolving in a solvent mixture of toluene: methyl ethyl ketone=9:1 to make a solid concentration of 25 wt. % was applied to both surfaces of the resulting adhesive layers on the metallic sheet to form vulcanizable rubber layers each having a thickness of 20 μm on both surfaces of the adhesive layers, followed by vulcanization at 220° C. for one minute.

| | Parts by weight |
|---|---|
| Hydrogenated nitrile rubber (Zetpol 2010; iodine value: 11) | 100 |
| SRF carbon black | 85 |
| White carbon (Nipseal ER, a product of Toso-Silica Co.) | 10 |
| Calcium carbonate (Hakuenka CC, a product of Shiroishi Kogyo Co.; average particle size: 0.05 μm, volumic fraction: 6%) | 30 |
| Antioxidant (Nocrack CD, a product of Ouchi-Shinko Chemical Co.) | 3 |
| Zink oxide | 5 |
| Stearic acid | 2 |
| Wax (Suntight R, a product of Seiko Chemical Co.) | 3 |
| Dicumyl peroxide (Percumyl D, a product of NOF Corp.) | 15 |
| N,N'-m-phenylene dimaleimide (Balnock PM-P, a product of Ouchi-Shinko Chemical Co.) | 5 |

A toluene dispersion of polyethylene resin admixed with a polybutadiene resin binder was applied to both surfaces of the resulting vulcanized rubber layers to prevent sticking, followed by air heating at 200° C. for 5 minutes to form sticking-preventive layers having a thickness of 5 μm on both surfaces of the vulcanized rubber layer.

Example 2

In Example 1, the amount of SRF carbon black was changed to 70 parts by weight, and that of calcium carbonate to 60 parts by weight (volumic fraction: 12%).

Example 3

In Example 1, the amount of SRF carbon black was changed to 50 parts by weight, and that of calcium carbonate to 100 parts by weight (volumic fraction: 19%).

Comparative Example 1

In Example 1, the amount of SRF carbon black was changed to 30 parts by weight, and that of calcium carbonate to 140 parts by weight (volumic fraction: 26%).

Comparative Example 2

In Example 1, the amount of SRF carbon black was changed to 10 parts by weight, and that of calcium carbonate to 180 parts by weight (volumic fraction: 33%).

The rubber-laminated metallic sheets (composite materials) obtained in the foregoing Examples and Comparative Examples were subjected to determination of normal state physical property, air heating tests, bulging tests and heat bending resistance tests.

Normal State Physical Property: Shore Hardness (Durometer A)

Air heating tests: The rubber-laminated metallic sheets were placed into a gear-type oven, air heated at 185° C. or 200° C. for 100 hours, and the surfaces were cross-cut with a cutter according to JIS K5600 corresponding to ASTM D3359, and then the state of rubber layer peeling after deterioration of cured rubber was visually observed, where 100% rubber retaining was given a grade 5, 95% to less than 100% a grade 4, 85% to less than 95% a grade 3, 65% to less than 85% a grade 2, and less than 65% a grade 1

Bulging test: The rubber-laminated metallic sheets were treated with a heating press and an exclusive mechanical tool at 150° C. and a surface pressure of 3 tons/cm$^2$ (294 MPa) for 5 minutes, and then the states of resulting damage and peeling of the rubber layer were evaluated according to the following grades:
  5: The rubber layer was completely retained
  4: The rubber layer was slightly flowed out (bulged)
  3: The rubber layer was flowed out without any exposure of the metal surface, while the rubber surface was uneven
  2: The rubber layer was flowed out with slight exposure of the metal surface
  1: The rubber layer was completely flowed out with complete exposure of the metal surface Heat bending resistance test (before tape sticking): The rubber-laminated metallic sheets were placed into a gear-type oven, air heated at 200° C. for 100 hours, and then subjected to a bending resistance test, using a mandrel, 6 mm in diameter, according to JIS K5600, where the adhesiveness between the rubber and the metal was evaluated according to the following grades:
  5: The rubber layer was completely retained (without cracks)
  4: Cracking of the rubber layer was visually unobservable
  3: Linear cracks were observed on the rubber layer
  2: Flake-like cracks were observed on the rubber layer
  1: The rubber layer was completely peeled away with complete exposure of metal surface Heat bending resistance test (after tape sticking): After the bending resistance test (before tape sticking), a cellophane adhesive tape, 18 mm or 24 mm wide (adhesive strength: 1.80 (N/10 mm) or more; tensile strength: 25.0 (N/mm) or more; elongation; 13% or more, and thickness: 0.06 mm or less) was sticked to the bending part, and removed by peeling at a peeling speed of 0.5-1 second within 5 minutes after the tape sticking to conduct the tape sticking test, where the state of rubber peeling was visually observed, and 100% rubber retaining was given a grade 5, 50% to less than 100% a grade 4, 25% to less than 50% a grade 3, 5% to less than 25% a grade 2, and less than 5% a grade 1.

The results are given in the following Table 1.

TABLE 1

| Test items | Example No. | | | Comp. Ex. No. | |
|---|---|---|---|---|---|
| | 1 | 2 | 3 | 1 | 2 |
| [Normal state physical property] | | | | | |
| Hardness (Duro A) | 94 | 93 | 94 | 94 | 94 |
| [Composite material characteristics] | | | | | |
| Air heating test | | | | | |
| Evaluation at 185° C. | 4 | 5 | 5 | 4 | 4 |
| Evaluation at 200° C. | 4 | 4 | 4 | 4 | 3 |
| Bulging test | | | | | |
| Evaluation | 4 | 5 | 4 | 2 | 1 |
| Heat bending resistance test | | | | | |
| Evaluation before tape sticking | 4 | 5 | 5 | 5 | 5 |
| Evaluation after tape sticking | 4 | 4 | 4 | 4 | 3 |

Examples 4 to 6, Comparative Examples 3 and 4

In Examples 1 to 3, Comparative Examples 1 and 2, calcium carbonate was replaced with the same amounts (the same volumic fraction) of kaolin (Translink 37, a product of Hayashi Kasei Co.; average particle size 1.4 μm), respectively. The results are shown in the following Table 2.

TABLE 2

| Test items | Example No. | | | Comp. Ex. No. | |
|---|---|---|---|---|---|
| | 4 | 5 | 6 | 3 | 4 |
| [Normal state physical property] | | | | | |
| Hardness (Duro A) | 93 | 93 | 93 | 92 | 92 |
| [Composite material characteristics] | | | | | |
| Air heating test | | | | | |
| Evaluation at 185° C. | 4 | 4 | 4 | 4 | 4 |
| Evaluation at 200° C. | 4 | 4 | 4 | 4 | 3 |
| Bulging test | | | | | |
| Evaluation | 4 | 4 | 4 | 2 | 1 |
| Heat bending resistance test | | | | | |
| Evaluation before tape sticking | 4 | 4 | 5 | 4 | 4 |
| Evaluation after tape sticking | 4 | 4 | 4 | 4 | 3 |

It can be seen from the foregoing results that, when an inorganic filler containing not more than 20% by volume, on the basis of total compound, of a non-reinforcing inorganic filler having an average particle size of not more than 1 μm, is added, the rubber bulging resistance (rubber flow resistance) can be improved when used at elevated temperatures and surface pressures (for example, 3 tons/cm$^2$).

INDUSTRIAL UTILITY

The present rubber-metal laminate is suitable for use as vulcanized rubber-laminated metallic sheets for forming sealing materials such as oil seals, packings, gaskets, etc. requiring a heat resistance, particularly engine gasket materials, for example, engine cylinder head gasket materials.

The invention claimed is:

1. A hydrogenated nitrile rubber-metal laminate, which comprises a metallic sheet having opposite surfaces which metallic sheet has been subjected to a hexavalent ions-free chemical conversion treatment, a defatting treatment, a surface-roughening treatment, a primer treatment, or a combination of the recited treatments, and an adhesion layer and a rubber layer successively laid on one or both of the opposite surfaces of the metallic sheet, the rubber layer being a vulcanizate of a hydrogenated nitrile rubber compound comprising 100 parts by weight of a hydrogenated nitrile rubber having an iodine value of 10-15, 50-250 parts by weight of an inorganic filler containing 5-20% by volume, on the basis of total hydrogenated nitrile rubber compound, of calcium carbonate as a non-reinforcing inorganic filler having an average particle size of 0.01-2 μm, 2-10 parts by weight of N, N'-m-phenylene dimaleimide and 4-20 parts by weight of an organic peroxide.

2. A hydrogenated nitrile rubber-metal laminate according to claim 1, wherein the hydrogenated nitrile rubber having an iodine value of 10-15 comprises a blend of hydrogenated nitrile rubbers having different iodine values.

3. A hydrogenated nitrile rubber-metal laminate according to claim 1; wherein said laminate is a sealing member.

4. A hydrogenated nitrile rubber-metal laminate according to claim 3; wherein said laminate is an engine gasket material.

5. A hydrogenated nitrile rubber-metal laminate according to claim 1; wherein said laminate is a sealing material.

\* \* \* \* \*